(12) United States Patent
Shiao et al.

(10) Patent No.: US 7,846,548 B2
(45) Date of Patent: Dec. 7, 2010

(54) FENCE OR DECKING MATERIALS WITH ENHANCED SOLAR REFLECTANCE

(75) Inventors: Ming-Liang Shiao, Collegeville, PA (US); Joong-Youn Kim, Newtown Square, PA (US)

(73) Assignee: CertainTeed Corporation, Valley Forge, PA (US)

( * ) Notice: Subject to any disclaimer, the term of this patent is extended or adjusted under 35 U.S.C. 154(b) by 938 days.

(21) Appl. No.: 11/588,577

(22) Filed: Oct. 27, 2006

(65) Prior Publication Data

US 2008/0102270 A1 May 1, 2008

(51) Int. Cl.
*B32B 27/32* (2006.01)
*B32B 5/16* (2006.01)
*B32B 9/04* (2006.01)
*B32B 27/00* (2006.01)
*B32B 27/08* (2006.01)

(52) U.S. Cl. .................... 428/411.1; 428/220; 428/323; 428/332; 428/500; 428/515

(58) Field of Classification Search ........................ None
See application file for complete search history.

(56) References Cited

U.S. PATENT DOCUMENTS

| 4,189,520 | A | 2/1980 | Gauchel |
| 4,598,015 | A | 7/1986 | Panush |
| 4,916,014 | A | 4/1990 | Weber et al. |
| 5,233,465 | A | 8/1993 | Wheatley et al. |
| 5,547,501 | A | 8/1996 | Maruyama et al. |
| 6,366,397 | B1 | 4/2002 | Genjima et al. |
| 6,521,038 | B2 | 2/2003 | Yanagimoto et al. |
| 2003/0030041 | A1 | 2/2003 | Genjima et al. |
| 2004/0191485 | A1 | 9/2004 | Groothues et al. |
| 2005/0072110 | A1 | 4/2005 | Shiao et al. |
| 2005/0072114 | A1 | 4/2005 | Shiao et al. |
| 2006/0029775 | A1 | 2/2006 | MacKinnon et al. |

OTHER PUBLICATIONS

Y. Jiang et al., "Novel Pigment Approaches in Optically Variable Including Polarizing Cholesteric Liquid Crystal (CLC) Polymers," *Optical Security and Counterfeit Deterrence Techniques IV*, SPIE 4677, 2002.

T.A. Germer et al., "Modeling the appearance of special effect pigment coatings," *Surface Scattering and Diffraction for Advanced Metrology*, Proc. SPIE 4447, 77-86, 2001.
L. Sung et al. "Characterization of Coating Microstructure Using Laser Scanning Confocal Microscopy," undated.
Adobe Systems Incorporated, Technical Guides "Color Models, The CIE Color Models", 2pgs., 2000.
Adobe Systems Incorporated, Technical Guides "Color Models, The Munsell Color System", 4pgs. 2000.
Adobe Systems Incorporated, Technical Guides "Color Models, CIELAB," 2pgs., 2000.
Adobe Systems Incorporated, Technical Guides "Color Models, CIEXYZ," 2pgs., 2000.
Project Advisory Committee Meeting, "Development of Cool Colored Roofing Materials," Oak Ridge National Laboratory and Livermore Berkeley National Laboratory, 55 pgs., Mar. 11, 2003.
Ferro Corporation, "How Cool Colors & Eclipse Work," 3 pgs. 1999-2003.
Ferro Corporation, "Cool Colors & Eclipse Heat and Energy Saving Pigments," 2 pgs., 1999-2003.
Gaco Western Inc., "Solar Reflectivity of Common Roofing Materials and GacoFlex Roof Coatings," 2 pgs., undated.
BASF Aktiengesellschaft, "Product Specification, SICOLUX Metal Gloss L 6015," 1 pg., Sep. 18, 2002.
BASF Aktiengesellschaft, "Product Specification, SICOLUX Copper Gloss L 3015," 1 pg., Sep. 18, 2002.
BASF Corporation, "BASF launches two new pigments for tile coatings" by BASF Corporation, 1 pg. 1998-2003.
Silberline Manufacturing Co., Inc., "StarBrite," 1 pg., 2003.

*Primary Examiner*—Sheeba Ahmed
(74) *Attorney, Agent, or Firm*—Duane Morris LLP (57) ABSTRACT

A co-extruded structural member is disclosed having first and second co-extruded layers. The first co-extruded substrate layer comprises a structural preform and is substantially reflective of near-infrared (near-IR) radiation. A co-extruded cap layer is substantially transparent to near-IR radiation. The cap layer can be provided in aesthetically pleasing dark colors, while heat absorption is minimized due to the reflective properties of the near-IR reflective substrate layer. Using a co-extrusion process enhances the durability of the ultimate product over previous systems which use relatively fragile paint coatings to limit heat absorption. By providing near-IR transmissive and reflective pigments within the co-extruded polymers, a highly durable finished product is obtained. The co-extruded layers are disclosed for use in fence and deck applications, but will also find application in a wide variety of building product applications, both exterior and interior.

43 Claims, 6 Drawing Sheets

FENCE OR DECKING MATERIALS WITH ENHANCED SOLAR REFLECTANCE

CROSS-REFERENCE TO RELATED APPLICATIONS

The application is related to co-pending U.S. Patent Application Publication Nos. 2005/0072110 to Shiao et al. (Ser. No. 10/749,680), filed Dec. 31, 2003, and 2005/0072114 to Shiao et al. (Ser. No. 10/679,898), filed Oct. 6, 2003, the entirety of which applications are incorporated by reference herein.

FIELD OF THE INVENTION

The invention relates generally to building materials having enhanced solar reflectance, and more particularly to improved dark colored fence and decking materials having enhanced solar reflectance.

BACKGROUND

For exterior vinyl fencing products, exterior colors are typically limited to white, since dark colors absorb substantial amounts of solar radiation which can cause undesirable heat rise within in the materials. In fencing materials this heat rise can cause excessive thermal expansion on the side of the fence that is exposed to the sun's rays. This thermal expansion is often substantially greater than the expansion on the opposite, shaded, side of the fence, and the differential expansion can result in unsightly bowing of the fencing members. For decking materials, which may not be subject to the same bowing problems as fencing materials, external colors are still limited to light colors since the surface of a dark-colored decking materials can absorb significant quantities of solar radiation and thus can be too hot to walk on in bare feet during a hot summer day.

Dark colored vinyl materials also often suffer from inferior weatherability and durability when exposed to outdoor environments due to the adverse interaction between the vinyl material and the near infrared (near IR) rays emitted by the sun.

IR reflective paints are known for use in minimizing heat absorption through surfaces exposed to the sun. Such paints typically incorporate a metallic oxide system pigment having a high reflectance of IR rays, such as titanium oxides, mixed metal titanates, iron oxides, barium oxide, and the like. Such paints are applied to the target object to form an IR reflective coating. IR reflective paints suffer, however, from the problem that only a limited range of colors may be produced, and desirable dark colors cannot practically be provided. Additionally, paint systems suffer from problems of poor adhesion and scuff or scratch resistance, and when the paint coating is degraded, the IR reflectance is compromised.

Thus, it would be desirable to provide a material coating or composition for use in manufacturing exterior building products in a wide range of highly-desirable outer surface colors—particularly dark colors—in which solar heat absorption is minimized, thus minimizing or eliminating the aforementioned problems.

SUMMARY

The disadvantages heretofore associated with the prior art are overcome by the inventive design for extruded IR-reflective products, in which the products are producible in a wide variety of desirable dark colors. The inventive design provides advantages including cost-effectiveness, efficiency, and longer life than previous designs.

A low radiant energy absorbing extruded polymer structure is disclosed. The structure may comprise first and second co-extruded layers, the first layer comprising a first polymer and being substantially near-infrared (near-IR) reflective, and the second layer comprising a second polymer and being substantially near-IR transmissive. The first coextruded layer may comprise PVC and said second co-extruded layer may comprise ethyl acrylate, methyl methacrylate, acrylic styrene copolymer, ASA, AES or ABS. The first layer may further comprise $TiO_2$ pigment.

The first layer may have a first coloration and the second layer may have a second coloration different from said first coloration. The second coloration may substantially obscure the first coloration. Further, the second coloration may be provided by a pigment selected from the group consisting of pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfide yellow, cadmium sulfoselenide orange, and organic pigments such as perylene black, phthalo blue, phthalo green, quinacridone red, diarylide yellow, azo red, and dioxazine purple.

The second layer may have a thickness of from about 0.5 mil to about 10 mil.

The second layer further may comprise near-IR reflecting pigment. The second layer may be substantially visibly clear, or it may be opaque. In one embodiment, the first layer is white and the second layer is black in visual appearance.

The structure may further comprise a reinforcing member disposed along a surface of the first layer to enhance the rigidity of the extruded polymer structure. In one embodiment, the structure comprises a fence rail, while in another embodiment the structure comprises a decking member.

A low heat absorbing fencing system is also disclosed. The system may comprise a plurality of co-extruded rail members and a plurality of co-extruded post members. The plurality of co-extruded rail members and plurality of co-extruded post members each may comprise a first and second co-extruded layers, the first layer comprising a first polymer and being substantially near-infrared (near-IR) reflective.

A method is disclosed for forming a low heat absorbing extruded polymer structure, comprising providing a first polymer in a first extruder, providing a second polymer in a second extruder, extruding the first polymer through a die to produce a structural preform, and co-extruding the second polymer onto an outer surface of the structural preform to provide a cap layer. At least a portion of the structural preform may be substantially near-infrared (near-IR) reflective and the cap layer may be substantially near-IR transmissive.

A method for controlling the dimensional stability of a polymeric building product is also disclosed, comprising selecting a first polymer having a deformation temperature; selecting a second polymer and co-extruding the first and second polymers to provide a multi-layer polymer profile comprising a substrate layer and a capping layer. The capping layer may be visibly opaque due to the addition of a first pigment, and may be substantially transparent to near-IR radiation. The substrate layer may be substantially reflective of near-IR radiation such that when the multi-layer polymer profile is exposed to direct sunlight, the heat absorbed by the profile will not increase the temperature of the profile to a value greater than the deformation temperature.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

Modern fence and deck materials are manufactured using a wide variety of man-made materials. Such materials are of substantial advantage to people and the environment because they needn't be treated with the toxic leachable chemicals that are often used for weatherproofing or insect-proofing of traditional wooden members. Recently, relatively inexpensive polymers such as polyvinylchloride (PVC) have been used to provide low cost, high quality finished building products. One benefit to using PVC is that it is amenable to fabrication via extrusion, which enables a high rate of production, further reducing costs.

As previously noted, one problem experienced with prior polymer fence systems occurs when the sun shines on only one side of the fence, which can result in substantial thermal expansion of the material on the sun-exposed side. The side of the fence that is not exposed to direct sunlight, however, does not experience the same temperature rise, and thus it will not expand at the same rate or to the same degree as occurs with the exposed side. The result is that the fence rails (or posts) can experience significant unsightly bowing. Where dark colored fence rails are used, this bowing can be particularly acute due to the generally high heat absorption properties associated with dark colors. In addition to the general unsightliness of such bowing, it can also attract attention to the fact that the fence is not made from wood. This is an additional disadvantage because one of the objects in the manufacture of polymer fencing members is to mimic the look of traditional wooden fences.

The present invention thus describes a co-extruded fence/deck material having high IR radiation reflectance (with resulting low heat buildup), and which can be produced in a wide variety of colors, including desirable dark colors such as dark brown, greens, grays, etc. Thus, the co-extruded product may have a co-extruded substrate layer having high IR radiation reflectance, and a co-extruded cap layer having high IR transmissibility. The co-extruded cap layer provides the desirable dark color, while the underlying first co-extruded layer provides the desired IR reflectance. The combination results in a dark colored material that minimizes IR radiation absorption (and the attendant heat absorption). The associated reduction in heat absorption reduces the differential expansion in fence structures, thereby minimizing bowing of fence structures, even when the fence structures are situated in geographic locations in which the IR-radiation intensity is relatively high, such as California, Texas, Kentucky and the like. Besides minimizing bowing in fence structures, the novel co-extruded arrangement finds application in minimizing the temperature of other dark-colored building materials subject to direct sunlight, such as decking members.

Figure 1:
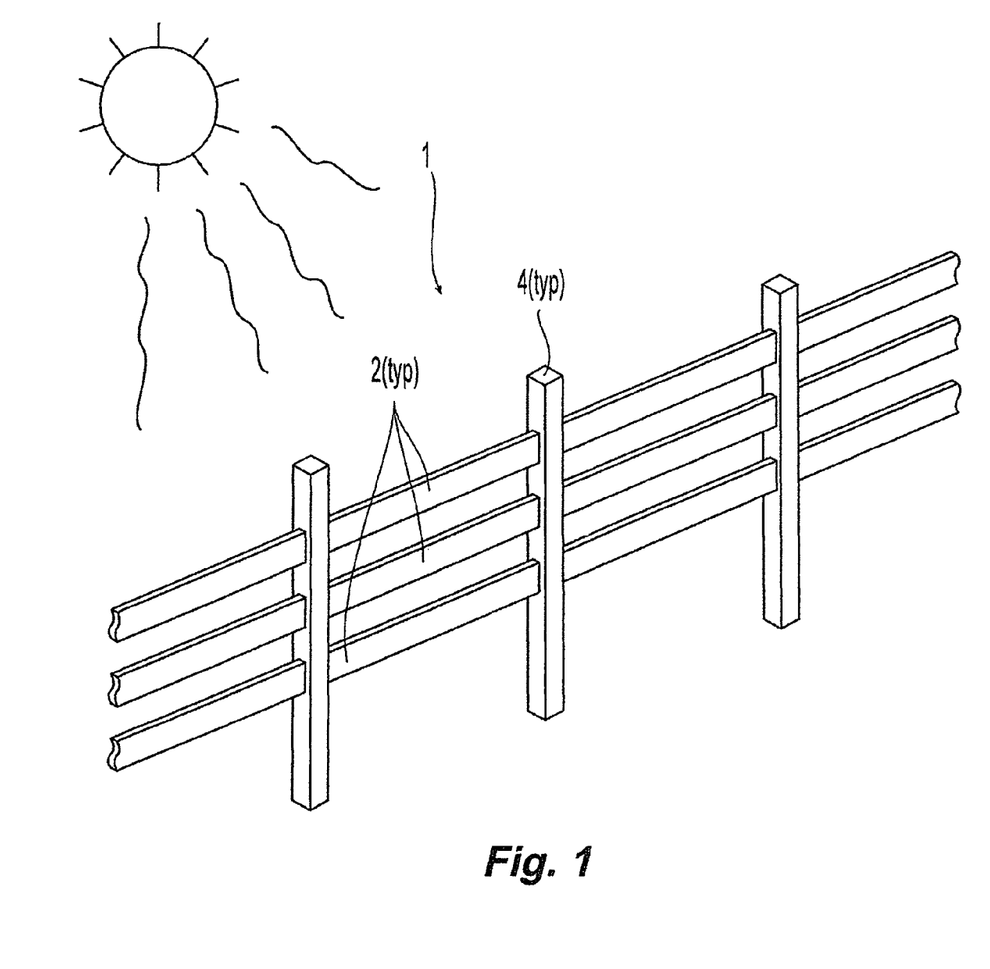
FIG. 1. is an isometric view of a typical vinyl fencing system.

The aforementioned problems of high solar heat absorption and inferior weatherability associated with dark colored vinyl materials are addressed by using a co-extruded cap layer over the surface of an appropriately pigmented white vinyl fence or decking substrate. Referring to FIG. 1, a typical outdoor fence system 1 is shown comprising a series of rails 2 and posts 4. For ease of description, the following discussion will refer to fencing structures, however, it will be appreciated that such description is equally applicable to deck structures or other building structures for which reduced heat absorption is desirable.

Figure 2:
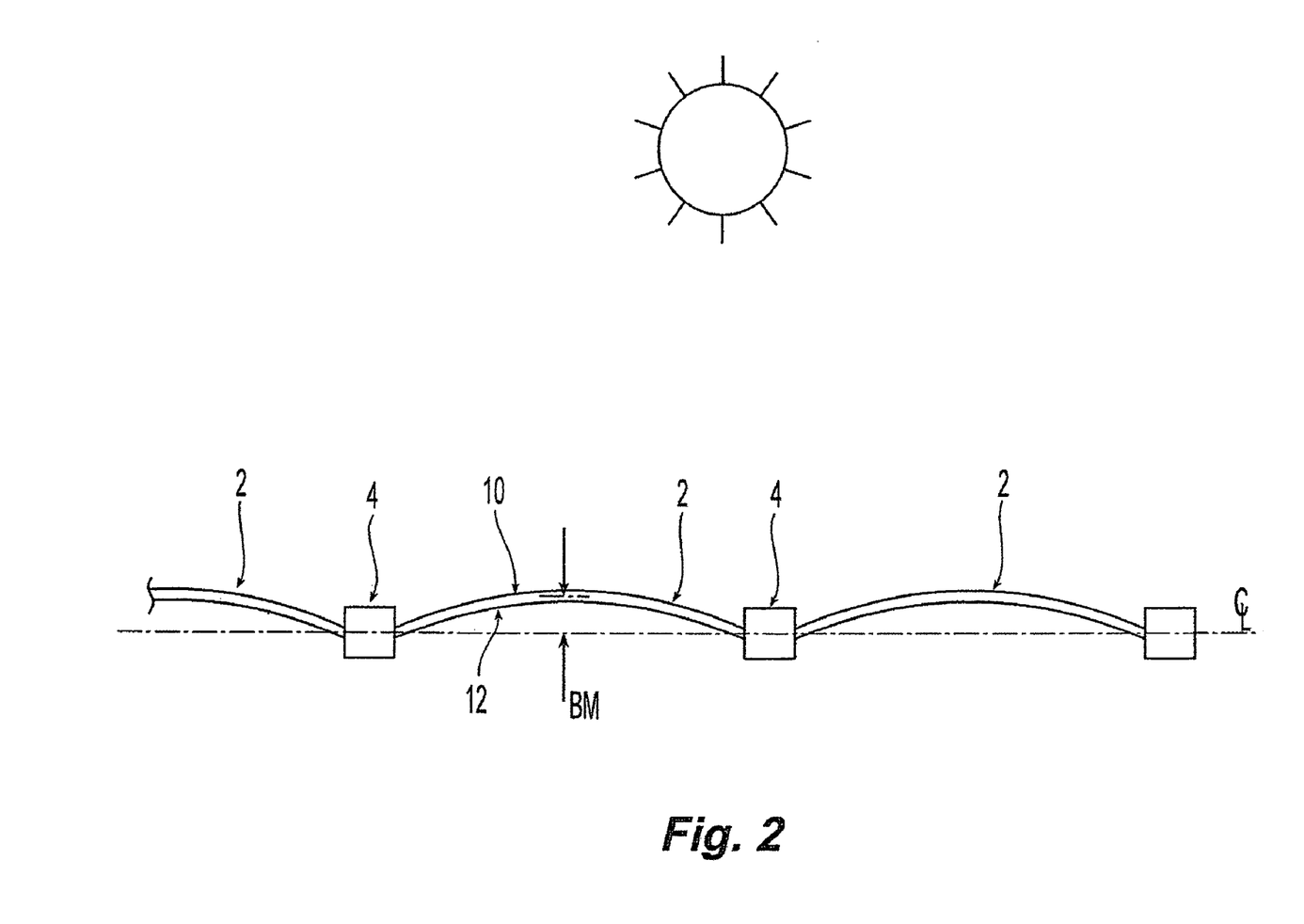
FIG. 2 is a plan view of the fencing system of FIG. 1, illustrating bowing of one of the rail members due to incident sunlight on only one side of the rail member.

As shown in FIG. 1, an outdoor fence system may be subjected to sunlight on only one side at a time, resulting in a buildup of heat on one side of the fence due to the absorption of radiant heat. Since the opposite side of the fence is shaded, or at least is not subject to direct sunlight, it absorbs substantially less radiant heat and thus will be at a lower temperature. This differential in temperature between opposite sides of the fence in turn causes differential expansion between the sides, to the point that the individual rail members 2 take on a bowed shape, as illustrated in FIG. 2. The magnitude of bowing "BM" is measured as the distance between the centerline of the rail member 2 in its bowed condition and the centerline of the rail member 2 in its unbowed condition. The amount of bowing will depend upon the intensity of the radiant energy incident upon a single side 10, 12 of the rail members 2 (measured as a temperature differential across the rail member), and it may increase and decrease as the sun's position changes in the sky throughout the day. Often, however, the intensity of the radiant energy is sufficient to cause a temperature rise in the rail member that exceeds the permanent deformation temperature of the material used to form the rail member. In such cases, the rail member may be permanently deformed and may hold the bowed shape even after the sun has changed position or has set for the day. This problem is exacerbated when using dark colored materials for the rail members 2 because dark materials tend to absorb more radiant energy than light colored materials. Dark colors, however, are often more aesthetically desirable than light colors.

Figure 3:
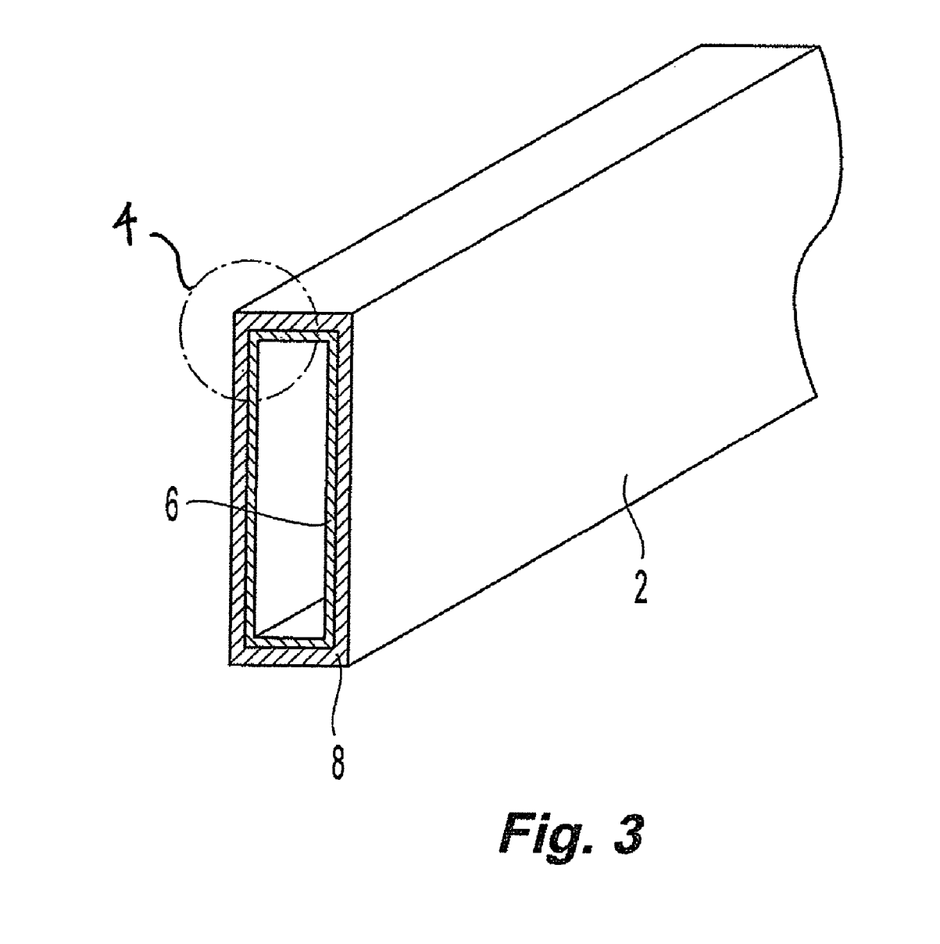
FIG. 3 is a cutaway view of a rail member for use in the fencing system of FIG. 1, the rail member incorporating the inventive structure.
Figure 4:
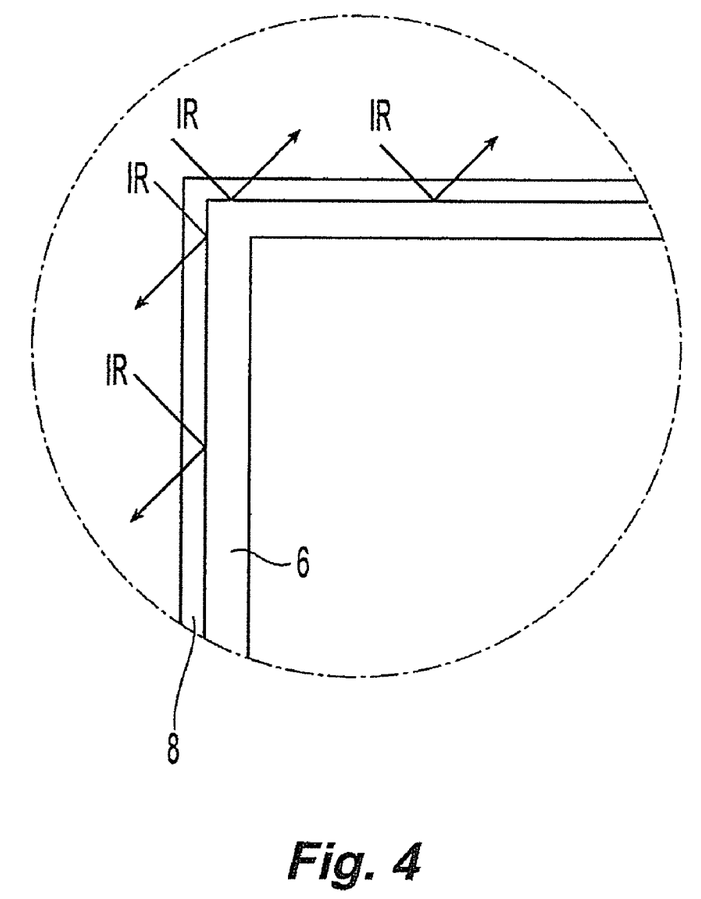
FIG. 4 is a detail view of one embodiment of the extruded layers making up the structure of FIG. 3.

In one embodiment of the invention shown in FIG. 3, a multi-layer extruded structural member (in an exemplary case, a fence rail 2) is provided having a substrate layer 6 formulated to provide a high degree of reflectance of near-IR radiation. A cap layer 8 is co-extruded with the substrate layer 6 and may be formulated to have a high degree of transparency to near-IR radiation. The cap layer 8 is further formulated to comprise pigments that can provide a wide variety of colors, including dark colors, without substantially affecting the layer's transparency to near-IR radiation. One embodiment of the invention is shown in FIG. 4. In this embodiment, the cap layer 8, includes pigments that allow the near-IR radiation of the solar spectrum to penetrate to the substrate layer 6, where the rays are reflected. This near-IR reflectance of the substrate reduces heat buildup in the structure. For purposes of the present application, a near IR transmissive material is one that allows transmission of greater than about 50% of the incident near IR rays, Preferably, the cap layer 8 will provide transmission of greater than about 70% of the incident near IR rays in the range of between 700-2500 nanometers.

The cap layer 8, in addition to being formulated for a high degree of near-IR transparency, may comprise a material that provides superior weathering properties, e.g., clear acrylic polymers, AES or ASA polymers, or fluorinated polymers. Further, in addition to pigments, the cap layer 8 may also comprise additives that provide enhanced UV protection. For the substrate layer 6, the use of $TiO_2$ can also provide UV protection to the substrate. Additional additives may comprise antioxidants, dispersants, lubricants, and biocides/algaecides. Additionally, depending on the polymer used for the cap layer 8 formulation, heat stabilizers or hindered amine light stabilizers (HALS) may also be added. In one embodiment, where the cap layer 8 comprises ASA, a light stabilizer such as Cyasorb UV 531 (2-Hydroxy-4-n-Octoxybenzophenone light stabilizer) may be added.

Examples of suitable materials for the cap layer 8 include PVDF, PVC, ABS, ASA, AES, PMMA, ASA/PVC alloy, and polycarbonate, including combinations thereof. In one preferred embodiment, the cap layer 8 comprises a mixture of ethyl acrylate (<0.1%); methyl methacrylate (<0.5%) and acrylic styrene copolymer (>99%) a commercial example of which is sold under the trade name Solarkote®)

Examples of suitable pigments for use in the cap layer 8 include, but are not limited to, pearlescent pigments, light-interference platelet pigments, ultramarine blue, ultramarine purple, cobalt chromite blue, cobalt aluminum blue, chrome titanate, nickel titanate, cadmum sulfide yellow, cadmium sulfide yellow, cadmium sulfoselenide orange, and organic pigments such as perylene black, phthalo blue, phthalo green, quinacridone red, diarylide yellow, azo red, and dioxazine purple.

Additional pigments may comprise iron oxide pigments, titanium oxide pigments, composite oxide system pigments, titanium oxide-coated mica pigments, iron oxide-coated mica pigments, scaly aluminum pigments, zinc oxide pigments, copper phthalocyanine pigment, dissimilar metal (nickel, cobalt, iron, or the like) phthalocyanine pigment, non-metallic phthalocyanine pigment, chlorinated phthalocyanine pigment, chlorinated-brominated phthalocyanine pigment, brominated phthalocyanine pigment, anthraquinone, quinacridone system pigment, diketo-pyrrolipyrrole system pigment, perylene system pigment, monoazo system pigment, diazo system pigment, condensed azo system pigment, metal complex system pigment, quinophthalone system pigment, Indanthrene Blue pigment, dioxadene violet pigment, anthraquinone pigment, metal complex pigment, benzimidazolone system pigment, and the like.

In some embodiments, it may also be desirable to provide the cap layer 8 with pigments that reflect near-IR radiation. Thus, in such embodiments, the cap layer 8 may preferably reflect at least 30% of incident near-IR radiation, more preferably it reflects at least 60% of near-IR radiation, and most preferably it reflects greater than 75% of near-IR radiation. In one embodiment, where pigmented PVC material is used for the substrate layer 6, at least 30% solar reflectance by the cap layer 8 is desirable.

Thus, solar-reflective pigments or fillers can be added to the cap layer to enhance the solar-reflectance of the structural member. Solar-reflective pigments are commercially available from Ferro Corp., Cleveland, Ohio; Shepherd Color Co., Cincinnati, Ohio, or from Engelhard Corp., Beachwood, Ohio. Examples of appropriate solar reflective fillers include, but are not limited to, $TiO_2$, metallic pigments, silica encapsulated metal flake, metal-coated silica, mirrorized silica filler, alumina, or nano-$TiO_2$. The use of such pigments for reducing solar heat absorption in roofing applications is disclosed in co-pending U.S. Patent Application Publication Nos. 2005/0072110 and 2005/0072114. both of which are assigned to the assignee of the present application.

The thickness "CT" (FIG. 4) of the cap layer 8 preferably should be as thin as possible to ensure transparency of the cap layer 8 to near-IR radiation, thereby minimizing the possibility of heat buildup in the cap layer 8 itself. However, since an important function of the cap layer 8 is to provide a desired pigmentation (e.g., a dark coloration), the thickness CT should be sufficient to impart the desired color while hiding the underlying coloration of the substrate layer 6. In some cases, it may be preferable to allow the coloration of the substrate layer 6 to contribute to the overall color of the structured member in combination with the capstock layer 8. In other cases, it may be preferable to allow the light (e.g., white) coloration of the substrate to be visible, and thus the cap layer 8 may be a visibly clear layer. Thus, providing a clear cap layer 8 may provide the desired near-IR transparency while also providing the structural member with enhanced weatherability as previously noted.

Where clear acrylic polymers are used for the cap layer 8, the thickness "CT" of the cap layer 8 should be less than about 10 mil. Where the cap layer 8 comprises an ASA polymer, the thickness should be less than about 5 mil. These thicknesses will ensure a suitable transparency of the cap layer 8 to near-IR radiation to minimize heat buildup in the cap layer. The thickness of the cap layer 8 preferably will be from about 0.5 to about 10 mils; and more preferably the thickness will be from about 1 to about 5 mils. In one embodiment, where the cap layer 8 comprises an acrylic polymer (e.g., PMMA), the cap layer thickness may be greater than about 4 mils to minimize effects from UV and IR transmittance to the substrate layer.

It will be appreciated that a thicker cap layer will enhance long-term UV protection of the substrate 6. Thus, in one embodiment the cap layer 8 may be thicker than about 4 mils.

Using a co-extrusion process makes it possible to manufacture profiles having a uniform cap layer 8 with the very small thicknesses noted above. Such uniformity is important, particularly when applying a cap layers having a thicknesses of down to about 0.5 mils, to ensure that a consistent coloration is provided for the product and also to ensure that a desired degree of near-IR transmission is maintained.

The substrate layer 6 may be any of a variety of polymer materials amenable to fabrication through an extrusion process. Examples of suitable polymers include polyethylene resin, ethylene-vinyl acetate copolymer resin, polypropylene resin, polystyrene resin, ASA resin, ABS resin, methacrylic resin, PVC resin, polyamide resin, polycarbonate resin, polyethylene terephthalate resin, polybutylene terephthalate resin, diallylphthalate resin, urea resin, melamine resin, xylene resin, phenol resin, unsaturated polyester resin, epoxy resin, furan resin, polybutadiene resin, polyurethane resin, melamine phenol resin, chlorinated polyethylene resin, vinylidene chloride resin, acrylic-vinyl chloride copolymer resin, polyacetal resin, polymethylpentene resin, polyphenylene oxide resin, denatured PPO resin, polyphenylene sulfide resin, butadiene styrene resin, polyamino bismaleimide resin, polysulfone resin, polybutylene resin, silicone resin, polyethylene tetrafluoride resin, polyethylene fluoride propylene resin, perfluoro alkoxy fluoride plastic, polyvinylidene fluoride resin, MBS resin, methacrylic-styrene resin, polyimide resin, polyallylate resin, polyallylsulfone resin, polyethersulfone resin, polyetheretherketone resin, chlorinated polyvinyl chloride resin, and the like.

Suitable near-IR reflecting pigments for the substrate layer 6 may be the same as those described previously in relation to the cap layer 8, including iron oxide pigment, titanium oxide (TiO$_2$) pigment, composite oxide system pigment, titanium oxide-coated mica pigment, iron oxide-coated mica pigment, scaly aluminum pigment, and zinc oxide pigment and may be employed as this type of infrared-reflecting pigment. Other examples include copper phthalocyanine pigment, dissimilar metal (nickel, cobalt, iron, or the like) phthalocyanine pigment, non-metallic phthalocyanine pigment, chlorinated phthalocyanine pigment, chlorinated-brominated phthalocyanine pigment, brominated phthalocyanine pigment, anthraquinone, quinacridone system pigment, diketo-pyrrolipyrrole system pigment, perylene system pigment, monoazo system pigment, diazo system pigment, condensed azo system pigment, metal complex system pigment, quinophthalone system pigment, Indanthrene Blue pigment, dioxadene violet pigment, anthraquinone pigment, metal complex pigment, benzimidazolone system pigment, and the like.

Additives for the substrate layer 6 may comprise heat stabilizers, HALS, hindered phenols, SA stabilizers, calcium carbonate, talc and other fillers, calcium and zinc stearate for use as processing aids, as well as impact modifiers, nano composite materials such as boehmite, organo-nanoclay, knaff, cellulose fibers, and the like.

Advantageously, the materials and pigments used to form the first and second extruded layers 6, 8 can be selected as desired in order to maintain the temperature of the polymer used for the substrate layer below that material's melting temperature $T_m$, or heat distortion temperature, $T_{HDT}$. Where the substrate layer 6 comprises PVC, this heat distortion temperature (based on ASTM D648 with a stress of 264 PSI) is about 70 degrees Celsius (° C.). Where the substrate layer 6 comprises ABS, this temperature is about 93° C. If the temperature of the structure is allowed to exceed this limit, then the structure may undergo permanent deformation simply due to the weight of the structure itself. Other loads, for example—a horse pushing against the fence, can result in additional substantial deformations if such loads are applied at the same time that the deformation temperature $T_{HDT}$ of the material is exceeded. Since PVC's deformation temperature is rather low, it is important that the temperature of the structure be kept as low as possible when PVC is used as the substrate material.

A desired structural profile (for example, fence rail member 2) may be produced using a process suitable for forming a consistent thin cap layer 8 on a structural polymer substrate 6. Since the cap layer 8 may provide the important function of either transmitting or reflecting incident near-IR rays, it would be advantageous to use a process that allows tight control over the thickness of the cap layer 8 applied to the substrate 6. This is particularly true when the the thickness of the cap layer is on the order of a few mils. A non-limiting listing of suitable processes comprises co-extrusion, co-injection, co-injection compression, film lamination and the like. In a preferred embodiment, the cap layer 8 and substrate 6 are produced using a co-extrusion process. The details of these processes are known in the art, and thus will not be described in detail herein.

Prior polymer fencing designs often attempted to counter the bowing problem by placing internal stiffening members (e.g., fiberglass, carbon, steel or aluminum rods) down the length of the rail and/or post members. Although the inventive substrate/capping layer arrangement may eliminate the need for such reinforcing members to prevent bowing, they may still be desirable for preventing damage due to external forces, such as horses pushing or rubbing against the rails. Thus, the profiles of the invention may be provided with appropriate reinforcing members, which may be integrally formed with the profile, or which may be received in appropriate recesses in the profile. In one embodiment, the profiles may be provided with a cellular core to ensure the profile has a desired level of solidity and rigidity. Such a cellular core may be particularly advantageous, for example, where the produced profile is a decking member or a roofing element.

It will be appreciated that although the invention has been described in relation to a fence rail member 2, that a wide variety of structural and non-structural profile members can be produced using the principles of the invention. Thus, the profile may comprise a polymeric building product such as a siding panel, a siding trim piece, a decking member, a window frame element or a roofing element such as a synthetic slate, synthetic tile or a synthetic shake.

Where the profile is a roofing element, it may be manufactured partly or entirely in accordance with the methods disclosed in pending U.S. patent application Ser. No. 11/227,009, filed Sep. 15, 2005, titled "PROCESS OF AND APPARATUS FOR MAKING A SHINGLE, AND SHINGLE MADE THEREBY," the entirety of which application is incorporated herein by reference.

Figure 5:
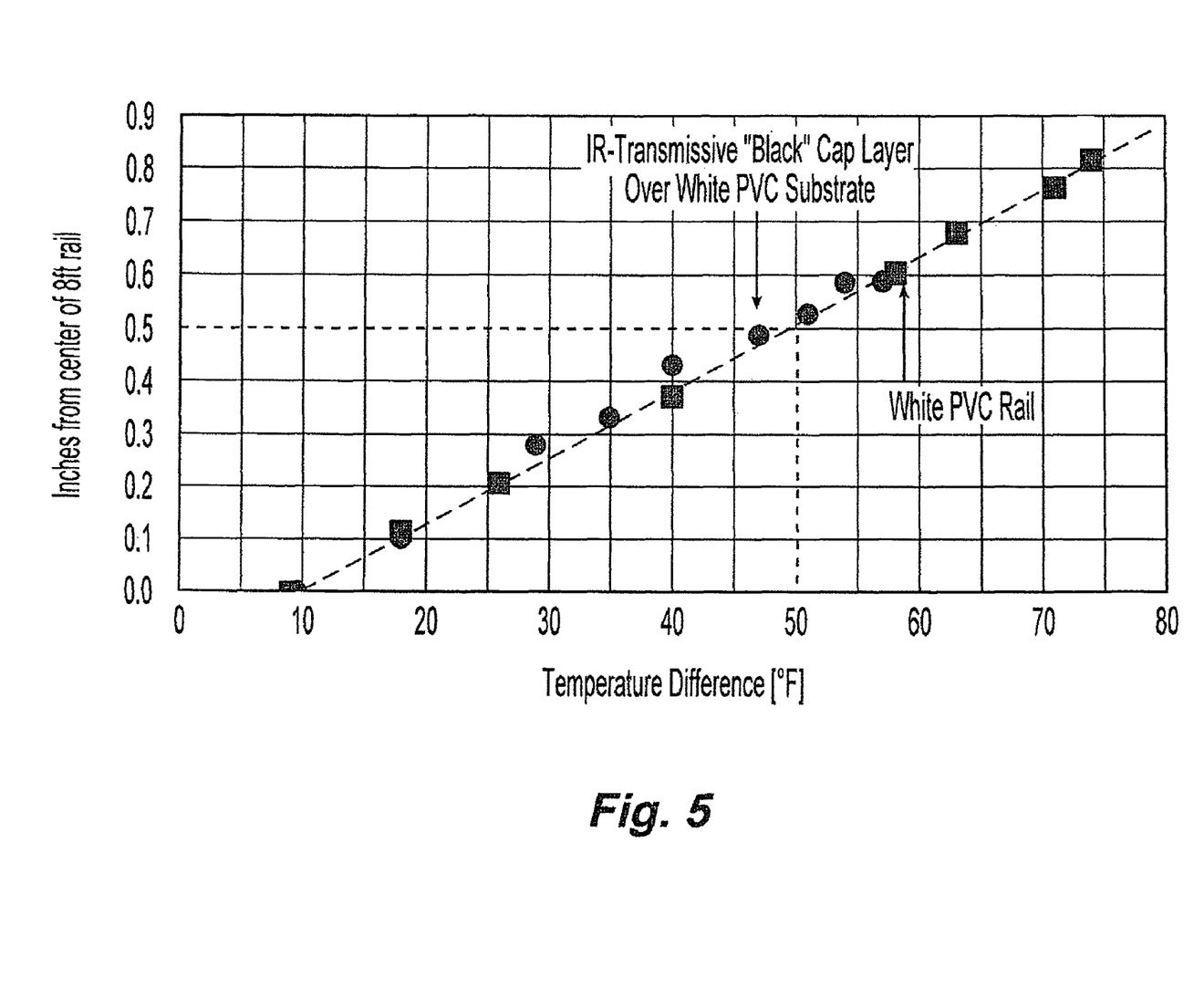
FIG. 5 is a graph illustrating a comparison of bowing of 8-foot fence rail segments made from black PVC and white PVC.

A number of tests were performed to examine the efficacy of the inventive design. For example, FIG. 5 shows a graph of bowing ranges for 8-foot lengths of fence rail members. Bowing of a standard white PVC fence rail is shown as a function of temperature difference in degrees Farenheit (F) between the sun-exposed 10 and shaded 12 sides (see FIG. 2) of the rail member. As previously noted, the differential expansion between opposite sides of a fence rail can cause unsightly bowing. Thus, a design objective is to produce a fence rail member that exhibits a low bow magnitude "BM" of no more than ½-inch from the center line of an 8-foot rail span. FIG. 5 illustrates bowing of rail samples as a function of distance from the center of an 8-foot rail span. The first rail member sample comprises a substrate layer 6 of extruded PVC and a co-extruded cap layer 8 comprising a mixture of ethyl acrylate (<0.1%), methyl methacrylate (<0.5%) and acrylic styrene copolymer (>99%) (a commercial example of which is sold under the trade name Solarkote®) pigmented with 1.25% weight percent Victory Black (Colour Index Pigment Green 17). The cap layer was near-IR transmissive. As can be seen in FIG. 5, this sample rail member experiences approximately equivalent bow magnitude as that of a standard white PVC rail member. For both the black and white rails, the bowing limit of ½ inch from the rail centerline is achieved where the temperature differential between the exposed 10 and shaded 12 sides of the rail 2 is less than or equal to about 50° F. Thus, it can be seen that black rails utilizing the inventive structure will experience bowing in approximately the same proportion as traditional white PVC rails.

Several exemplary tests were performed using samples of fence rails prepared in accordance with the invention.

BLUE BELL, PA EXAMPLE 8 foot test samples of fence railing were prepared, and set between standard fence posts. The cap layer for each of the samples was acrylic material. Temperatures were measured at mid-day, and the measured ambient air temperature was 91° F. No sagging was observed in any samples. The design objective was to observe a bow of less than about 0.5 inches at the center of the rail samples. As can be seen in the table below, sample 2 (PVC substrate with near-IR transmissive Acrylic cap layer) met the test criteria for bowing, while samples 1 and 3 slightly exceeded the criteria. Sample 4 (having a Carbon Black pigmented cap layer) was used as a control, and exceeded the criteria for bowing by about 50%.

| Sample | Cap Material | Cap Layer Reflective/ Transmissive[1] | Substrate Material | Heat Buildup Exposed | Heat Buildup Shaded | Delta T | Bowing |
|---|---|---|---|---|---|---|---|
| 1 | Acrylic, pigmented with 1.25 weight % Colour Index Pigment Green 17 | Reflective | PVC | 141° F. | 111° F. | 30° F. | 0.501" |
| 2 | Acrylic, pigmented with 1.00 weight % perylene black (BASF Lumogene 8600) | Transmissive | PVC | 133° F. | 109° F. | 24° F. | 0.154" |
| 3 | Acrylic, pigmented with 1.00 weight % perylene black (BASF Lumogene 8600) | Transmissive | ABS | 133° F. | 110° F. | 23° F. | 0.521" |
| 4 | Acrylic, pigmented with 1.00 weight % Carbon Black | Reflective | PVC | 154° F. | 116° F. | 38° F. | 0.738" |

[1] IR transmissive is considered to be greater than 50% transmission of near-IR rays; IR reflective is considered to be less than 50% transmission of near-IR rays.

It can also be seen from the table that the ABS sample (sample 3), while experiencing approximately the same "Delta T" as the PVC sample 2, experienced almost three and one half times the bowing of the PVC sample. Without being limited to any particular theory, the inventors believe that this is attributable to the fact that the ABS sample (sample 3) had a thinner wall thickness (about 60 mils), compared to an 0.80 mil wall thickness for the PVC profile sample (sample 2). Additionally, the thermal expansion coefficient for the ABS compound used in sample 3 was about 10% higher than the PVC compound used for sample 2.

KING OF PRUSSIA, PA EXAMPLE

As with the previous tests, 8 foot test samples of fence railing were prepared, and set between standard fence posts. The cap layer for each of the samples was clear ABS material. No sagging was observed in any samples. The design objective was to observe a bow of less than about 0.5 inches. As can be seen in the table below, all three samples met the test criteria for bowing.

| Sample | Cap Material | Cap Layer Reflective/ Transmissive[1] | Substrate Material | Heat Buildup Exposed | Heat Buildup Shaded | Delta T | Bowing |
|---|---|---|---|---|---|---|---|
| 1 | Acrylic, pigmented with 1.25 weight % Colour Index Pigment Green 17 | Reflective | ABS | 122° F. | 98° F. | 24° F. | 0.266" |
| 2 | Acrylic, pigmented with 1.00 weight % perylene black (BASF Lumogene 8600) | Transmissive | PVC | 112° F. | 95° F. | 17° F. | 0.040" |
| 3 | Acrylic, pigmented with 1.00 weight % perylene black (BASF Lumogene 8600) | Transmissive | ABS | 114° F. | 98° F. | 16° F. | 0.074" |

[1] IR transmissive is considered to be greater than 50% transmission of near-IR rays; IR reflective is considered to be less than 50% transmission of near-IR rays.

In addition, weatherability testing was performed to determine how dark colored fence rails constructed in accordance with the invention would fare under long term exposure conditions. Two samples were tested. Sample "A" consisted of a rail member having a PVC substrate and a near-IR transmissive cap layer of Acrylic, pigmented with 1.00 weight % perylene black (BASF Lumogene 8600). Sample "B" consisted of a rail member having a PVC substrate and a near-IR reflective cap layer of Acrylic, pigmented with 1.25 weight % Colour Index Pigment Green 17. The thickness of the cap layer for both samples was approximately 6 mils. The samples were exposed to weathering conditions using an Atlas CS65 weatherometer. Testing was performed in accordance with ASTM G155. A 7000 hour exposure period was simulated.

Figure 6:
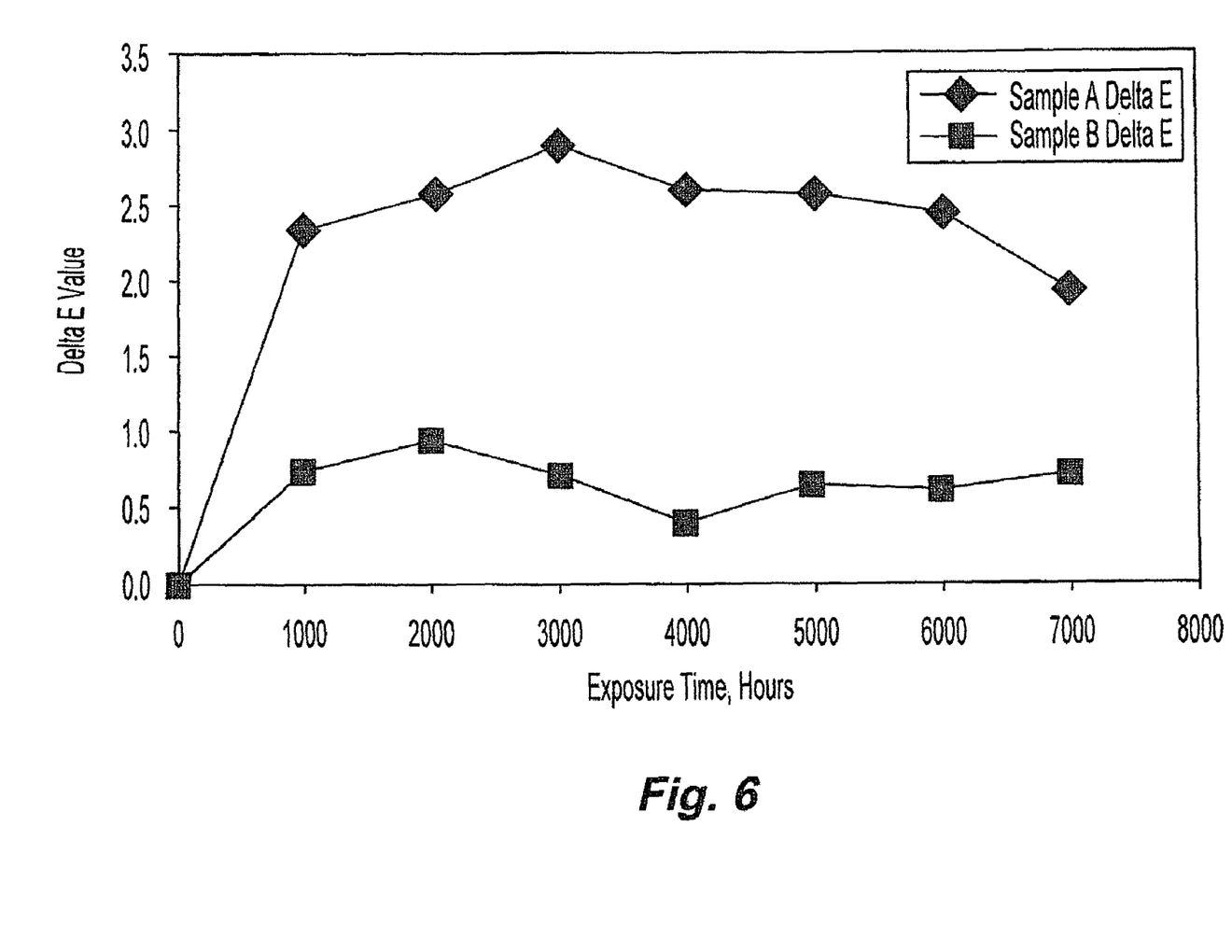
FIG. 6 is a graph illustrating the results of long-term weatherability testing of rail members fabricated in accordance with the inventive structure.

FIG. 6 is a graphical illustration of the results of this testing, and shows a comparison between exposure time and "Delta E" value for Samples A and B, where the Delta E value is a quantification of the total color difference in a sample over time, according to the following formula:

$$\Delta E = \sqrt{(\Delta L^*)2 + (\Delta a^*)2 + (\Delta b^*)2}$$

The (L,a,b) scale mimics the human eye's response, where:
L*=measure of the black/white index (where black=0 and white=100);
a*=measure of the red/green index (where + means red, − means green); and
b*=measure of the yellow/blue index, (where + means yellow and − means blue).

In the test, $L^*_1$, $a^*_1$ and $b^*_1$ were measured for each sample before exposure, while $L^*_N$, $a^*_N$ and $b^*_N$ were measured at approximately 1000 hour increments of exposure. As a practical matter, a ΔE value of less than 1.5 is not generally discernable by the human eye. A ΔE value of less than 3 is considered to be acceptable, and was thus the goal of the test. As can be seen in FIG. 6, the change shown over a 7000 hour exposure period is shown to be less than the design limit (ΔE value of less than 1.5) for both tested samples, and thus is considered to have been a success.

It is noted that the substrate layer 6 and the capping layer 8 may each be provided as a single layer, or they each may be provided in multiple layers. For example, the cap layer 8 may comprise two layers, the first layer being a colorant layer and the second layer being a protectant layer. Additionally, the substrate layer 6 may be formed over a cellular core to provide a substantially solid profile product.

One of ordinary skill in the art will recognize the advantage of the inventive structure in that it allows the production of a robust structural member in darker colors, for use in fence or decking applications, from relatively inexpensive PVC material having a thinner wall thickness than previous designs. Such production is possible due to the aforementioned reduction in differential thermal expansion across the structural member, which reduces bowing of the member and thus reduces the overall surface temperature of the member. Previous efforts at addressing bowing problems have focused on enhancing the stiffness of the structural member, either by using very thick base layers, by using more expensive substrate materials (e.g., ABS), or by applying additional reinforcing members (steel or carbon rods) to the interior of the structural member. These prior approaches, however, resulted in increased costs of production. The current invention allows for efficient production of a structural member made from a PVC substrate having a relatively thin wall thickness, and without the need for supplemental reinforcing members to prevent bowing. This results in a lighter and less expensive ultimate product.

It will be understood that the description and drawings presented herein represent an embodiment of the invention, and are therefore merely representative of the subject matter that is broadly contemplated by the invention. It will be further understood that the scope of the present invention encompasses other embodiments that may become obvious to those skilled in the art, and that the scope of the invention is accordingly limited by nothing other than the appended claims.

The invention claimed is:

1. A low radiant energy absorbing extruded polymer structure comprising:
    a longitudinal structure comprising first and second co-extruded layers and having first and second sides and a longitudinal centerline;
    the first layer comprising a first polymer and being substantially near-infrared (near-IR) reflective;
    the second layer comprising a second polymer, the second layer being substantially near-IR transmissive and substantially visibly opaque;
    wherein the first and second polymers are selected such that the longitudinal structure does not bow more than ½-inch from the longitudinal centerline of an 8-foot length of the longitudinal structure when only one side of the longitudinal structure is exposed to direct sunlight.

2. The structure of claim 1, wherein said first coextruded layer comprises a first polymer selected from the group of PVC, PP, PE polymers and copolymers and mixtures thereof and said second co-extruded layer comprises a second polymer selected from a group of ABS, AES, ASA, and PP, PE, and PVC polymers and copolymers and mixtures thereof.

3. The structure of claim 1, wherein the first layer comprises $TiO_2$ pigment.

4. The structure of claim 1, wherein first layer has a first coloration and the second layer has a second coloration different from said first coloration.

5. The structure of claim 4, wherein the second coloration substantially obscures the first coloration.

6. The structure of claim 4, wherein the second coloration is provided by a pigment selected from the group consisting of pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfide yellow, cadmium sulfoselenide orange, and organic pigments such as perylene pigments, phthalo blue, phthalo green, quinacridone red, diarylide yellow, and dioxazine purple.

7. The structure of claim 1, wherein the second layer has a thickness of from about 0.5 mil to about 10 mil.

8. The structure of claim 1, wherein the second layer further comprises near-IR reflecting pigment.

9. The structure of claim 1, wherein the first layer is white and the second layer is black.

10. The structure of claim 1, further comprising a reinforcing member disposed along a surface of said first layer to enhance the rigidity of the extruded polymer structure.

11. The structure of claim 1, wherein the structure comprises a fence rail.

12. The structure of claim 1, wherein the structure comprises a decking member.

13. The structure of claim 1, wherein the structure comprises a polymeric building product selected from the group consisting of a fence rail, a fence post, a siding panel, a siding trim piece, a decking member, a window frame element and a roofing element.

14. The structure of claim 13, wherein the structure comprises a roofing element selected from the group consisting of synthetic slates, synthetic tiles, and synthetic shakes.

15. A low heat absorbing polymeric structure, comprising:
a longitudinal structure comprising first and second coextruded layers, the structure having first and second sides and a length,
wherein the first layer comprises a first polymer that is substantially near-infrared (near -IR)reflective, the second layer comprises a second polymer and is substantially near-infrared transmissive and substantially visibly opaque, and
wherein the second layer overlies the first layer; and
wherein the first and second polymers are selected such that the longitudinal structure does not bow by an amount more than ½% of the length of the longitudinal structure when only one of the first and second sides is exposed to direct sunlight.

16. The structure of claim 15, wherein said first coextruded layer comprises a first polymer selected from the group of PVC, PP, PE polymers and copolymers and mixtures thereof and said second co-extruded layer comprises a second polymer selected from a group of ABS, AES, ASA, and PP, PE, and PVC polymers and copolymers and mixtures thereof 17. The structure of claim 15, wherein first layer has a first coloration and the second layer has a second coloration different from said first coloration.

18. The structure of claim 17, wherein the first layer comprises $TiO_2$ pigment.

19. The structure of claim 17, wherein the second coloration substantially obscures the first coloration.

20. The structure of claim 17, wherein the second coloration is provided by a pigment selected from the group consisting of pearlescent pigments, light-interference platelet pigments, ultramarine blue, ultramarine purple, cobalt chromite blue, cobalt aluminum blue, chrome titanate, nickel titanate, cadmum sulfide yellow, cadmium sulfide yellow, cadmium sulfoselenide orange, and organic pigments such as perylene pigments, phthalo blue, phthalo green, quinacridone red, diarylide yellow, and dioxazine purple.

21. The structure of claim 15, wherein the second layer has a thickness of from about 0.5 mil to about 10 mil.

22. The structure of claim 15, wherein the second layer further comprises near-IR reflecting pigment.

23. The structure of claim 15, wherein the first layer is white and the second layer is black.

24. The structure of claim 15, further comprising a reinforcing member disposed along a surface of said first layer to enhance the rigidity of the extruded polymer structure.

25. A low heat absorbing extruded polymer structure comprising:
a structural preform; and
a cap layer overlying the structural preform; and
a cellular core attached to the structural preform for enhancing a structural rigidity of the extruded polymer structure;
wherein at least a portion of the structural preform is substantially near-infrared (near-IR) reflective, and the cap layer is substantially near-IR transmissive and substantially visibly opaque.

26. The structure of claim 25, wherein the structural preform comprises a polymer selected from the group of PVC, PP, PE polymers and copolymers and mixtures thereof and the second polymer is selected from a group of ABS, AES, ASA, and PP, PE, and PVC polymers and copolymers and mixtures thereof.

27. The structure of claim 25, wherein the cap layer comprises $TiO_2$.

28. The structure of claim 25, wherein the structural preform has a first coloration and the cap layer has a second coloration different from said first coloration.

29. The structure of claim 28, wherein the second coloration substantially obscures the first coloration.

30. The structure of claim 25, wherein the preform layer is white and the cap layer is black.

31. The structure of claim 28, wherein the second coloration is provided by a pigment selected from the group consisting of pearlescent pigments, light-interference platelet pigments, ultramarine blue, ultramarine purple, cobalt chromite blue, cobalt aluminum blue, chrome titanate, nickel titanate, cadmum sulfide yellow, cadmium sulfide yellow, cadmium sulfoselenide orange, and organic pigments such as perylene pigments, phthalo blue, phthalo green, quinacridone red, diarylide yellow, and dioxazine purple.

32. The structure of claim 25, wherein the cap layer has a thickness of from about 0.5 mil to about 10 mil.

33. The structure of claim 25, wherein the cap layer further comprises near-IR reflecting pigment.

34. The structure of claim 25, wherein the structural preform further comprises a receiving surface for engaging a reinforcing member.

35. The structure of claim 34, further comprising a reinforcing member coupled to said receiving surface.

36. A polymeric structure, comprising:
a longitudinal structure comprising a multi-layer polymer profile having a polymer substrate layer and a polymer capping layer;
wherein said capping layer comprises a first pigment that renders the capping layer visibly opaque and substantially transparent to near-IR radiation; and
wherein the substrate layer is substantially reflective of near-IR radiation; and
wherein the substrate layer and the capping are selected such that the when the structure is exposed to direct sunlight, the heat absorbed by the profile will not increase the temperature of the profile to a value greater than a deformation temperature of the substrate layer or the capping layer.

37. The structure of claim 36, wherein the capping layer comprises PVC having a deformation temperature of about 70 degrees Celsius.

38. The structure of claim 36, wherein the first pigment is selected from the group consisting of pearlescent pigments, light-interference platelet pigments, ultramarine blue, ultramarine purple, cobalt chromite blue, cobalt aluminum blue, chrome titanate, nickel titanate, cadmum sulfide yellow, cadmium sulfide yellow, cadmium sulfoselenide orange, and organic pigments such as perylene pigments, phthalo blue, phthalo green, quinacridone red, diarylide yellow, and dioxazine purple.

39. The structure of claim 36, wherein the substrate layer reflects more than about 60% of incident near-IR radiation.

40. The structure of claim 36, wherein the capping layer transmits more than about 50% of incident near-IR radiation to the substrate layer.

41. The structure of claim 36, wherein the substrate layer comprises $TiO_2$ pigment.

42. The structure of claim 36, wherein the substrate layer comprises ABS.

43. The structure of claim 36, wherein the structure comprises a building product selected from the group consisting of a fence rail, a fence post, a siding panel, a siding trim piece, a decking member, a window frame element and a roofing element.

* * * * *